United States Patent Office 3,485,097
Patented Dec. 23, 1969

3,485,097
AIRCRAFT INSTRUMENTS
Stanley Bernard Newport, 7 Morlands Drive, Charlton Kings, and Michael King Russell, 3 Culross Close, both of Cheltenham, England
Filed Feb. 29, 1968, Ser. No. 709,244
Claims priority, application Great Britain, Mar. 3, 1967, 10,119/67
Int. Cl. G01c 3/00
U.S. Cl. 73—178                                13 Claims

ABSTRACT OF THE DISCLOSURE

An aircraft overshoot director computes a demand for pitching movement of the aircraft at the extent to which the sum of two terms proportional respectively to the aircraft incidence- and pitch-angles, differs from the sum of a programmed constant and a term proportional to forward acceleration of the aircraft. The difference is either displayed directly, or is compared with aircraft pitch-rate to provide a notional pitch-rate demand.

---

Figure 1:
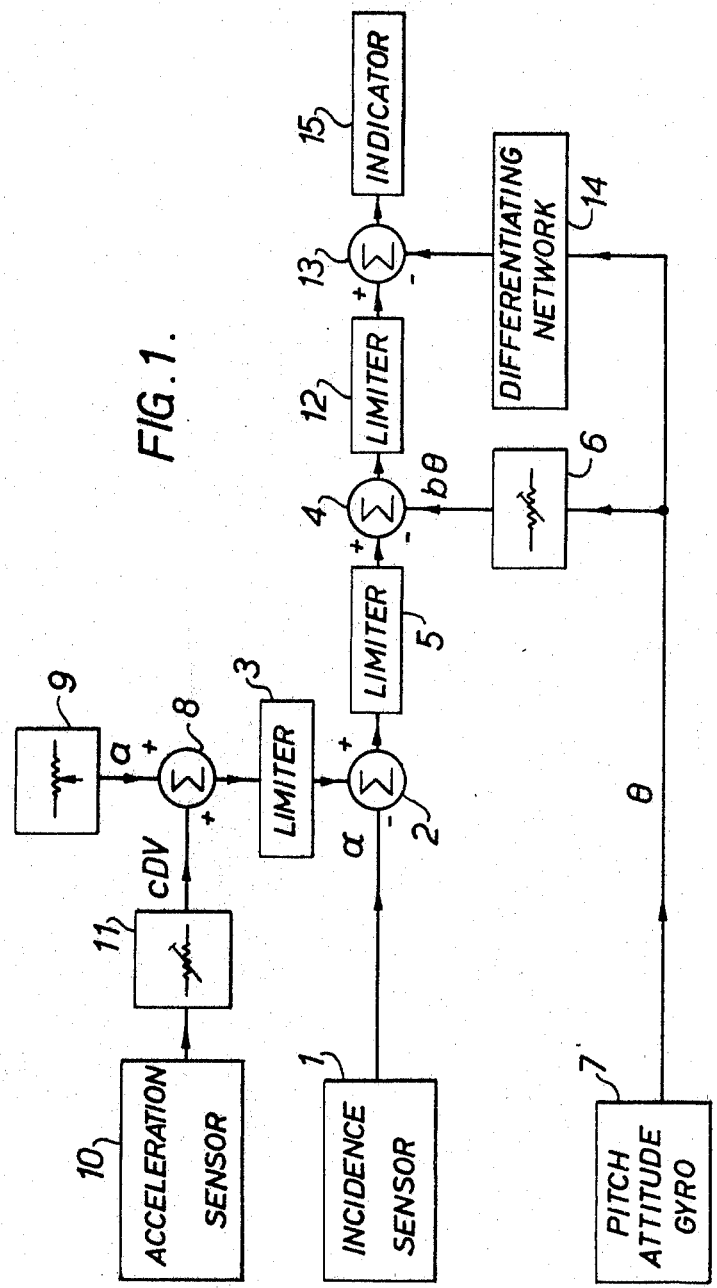

The present invention relates to aircraft instruments.

It is becoming increasingly necessary to provide fast modern aircraft with instruments that are designed specifically to deal with certain critical flight manoeuvres and present to the pilot information regarding the action he must take. One such critical manoeuvre is that of overshoot, that is to say, the manoeuvre which is initiated when an approach to a landing is abandoned. During the overshoot manoeuvre the aircraft has to be handled with precision in order that the flight path shall be well above obstacles on the ground and yet not at any stage so steep that the aircraft fails to gain or maintain sufficient speed for safe flight.

An aircraft instrument that may be used especially to assist a pilot in achieving an acceptable flight path during an overshoot manoeuvre is described in U.S. patent application Ser. No. 521,372 filed Jan. 18, 1966 in the names of M. K. Russell and E. R. Kendall, now U.S. Patent No. 3,369,396. This instrument is based on the discovery that, over a wide range of performance conditions of the aircraft concerned, a satisfactory steady climb-out in an overshoot manoeuvre can be achieved if the aircraft is controlled in pitch to maintain:

$$a - (\alpha + b\theta) = 0$$

where
$a$ is a constant having, for example, a value of thirteen degrees,
$\alpha$ is the angle of incidence, otherwise known as angle of attack, of the aircraft,
$\theta$ is the pitch angle of the aircraft, and
$b$ is a positive factor having, for example, a value of 0.6.

The choice of value for the constant $a$, and also the choice of value for the constant factor $b$, depends, among other things, upon the type of aircraft used, the range of performance conditions that is to be covered, and the climb-out requirements within the range.

According to the present invention, an aircraft instrument comprises first means for providing a first signal dependent upon pitch attitude $\theta$ of the aircraft, second means for providing a second signal dependent upon incidence $\alpha$ of the aircraft, third means for providing a third signal dependent upon forward acceleration DV of the aircraft, and fourth means for providing in accordance with said first, second and third signals a representation dependent upon the difference between the function $(\alpha + b\theta)$ and the function $(a + cDV)$, where the values of $a$, $b$ and $c$ are all positive.

Although in this specification the notation DV is used to represent forward acceleration (V denoting the forward speed of the aircraft and D the operator representative of differentiation with respect to time), this is not to be understood as implying that such acceleration is necessarily sensed specifically as the rate of change of a representation of forward speed. The third signal specified in the preceding paragraph may be derived by an accelerometer responsive to forward acceleration, or in fact by an arrangement involving differentiation of a signal representative of the forward speed. Alternatively, it may be derived from a filtered combination of two signals, one derived by an accelerometer responsive to forward acceleration and the other by a forward-speed sensor.

The use of the term $cDV$ to supplement the term $a$ has been found to be of advantage especially during the flare-up phase of an overshoot manoeuvre, and where a change in flap-angle is made during the climb-out phase. In particular, the term $cDV$ acts during forward acceleration of the aircraft effectively to boost the value of the term $a$, and at this time ensure a stronger demand for pitching movement than otherwise would be the case.

The representation provided by the instrument may be a visual representation or alternatively a signal (for example, an electric signal) representing the difference between the values of the two functions. Where the representation is provided in the form of a signal, this in its turn may be used in the provision of some other representation dependent upon the difference between the two functions. For example, where it is desired to provide the pilot with direction as to the manner in which he is to reduce the difference to zero, the signal may be taken either as a demand for change of pitch attitude or as a demand for rate of change of pitch attitude, and then used in the provision of a representation of the difference between the demanded and actual pitch attitude, or rate of change of pitch attitude, as the case may be. Alternatively, however, in the event that fully- or semi-automatic aircraft control facilities are provided, the signal may be used more directly in the control of the aircraft.

Although specific reference has been made above to use of the aircraft instrument of the present invention for the overshoot manoeuvre, it is also applicable at least for climb-out of a take-off manoeuvre.

Figure 2:
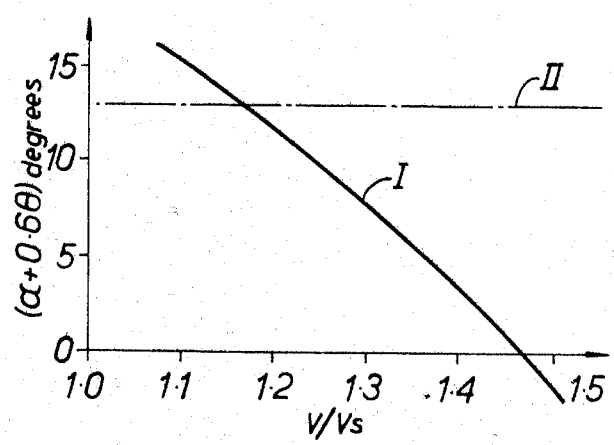
Figure 3:
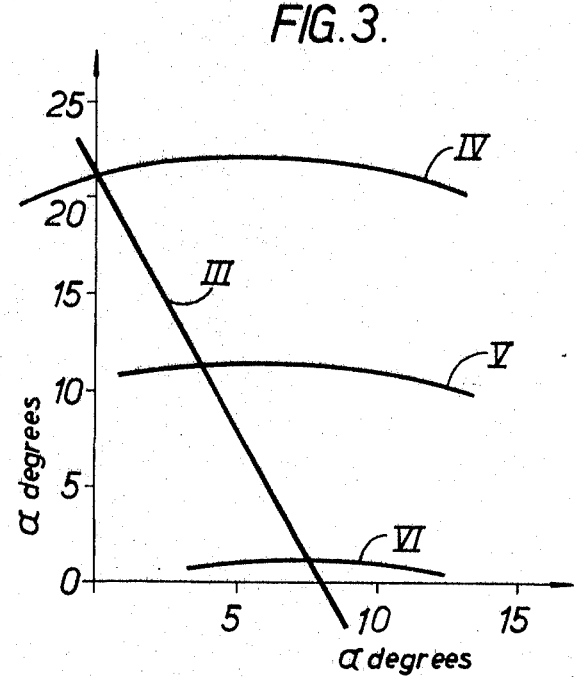
Figure 4:
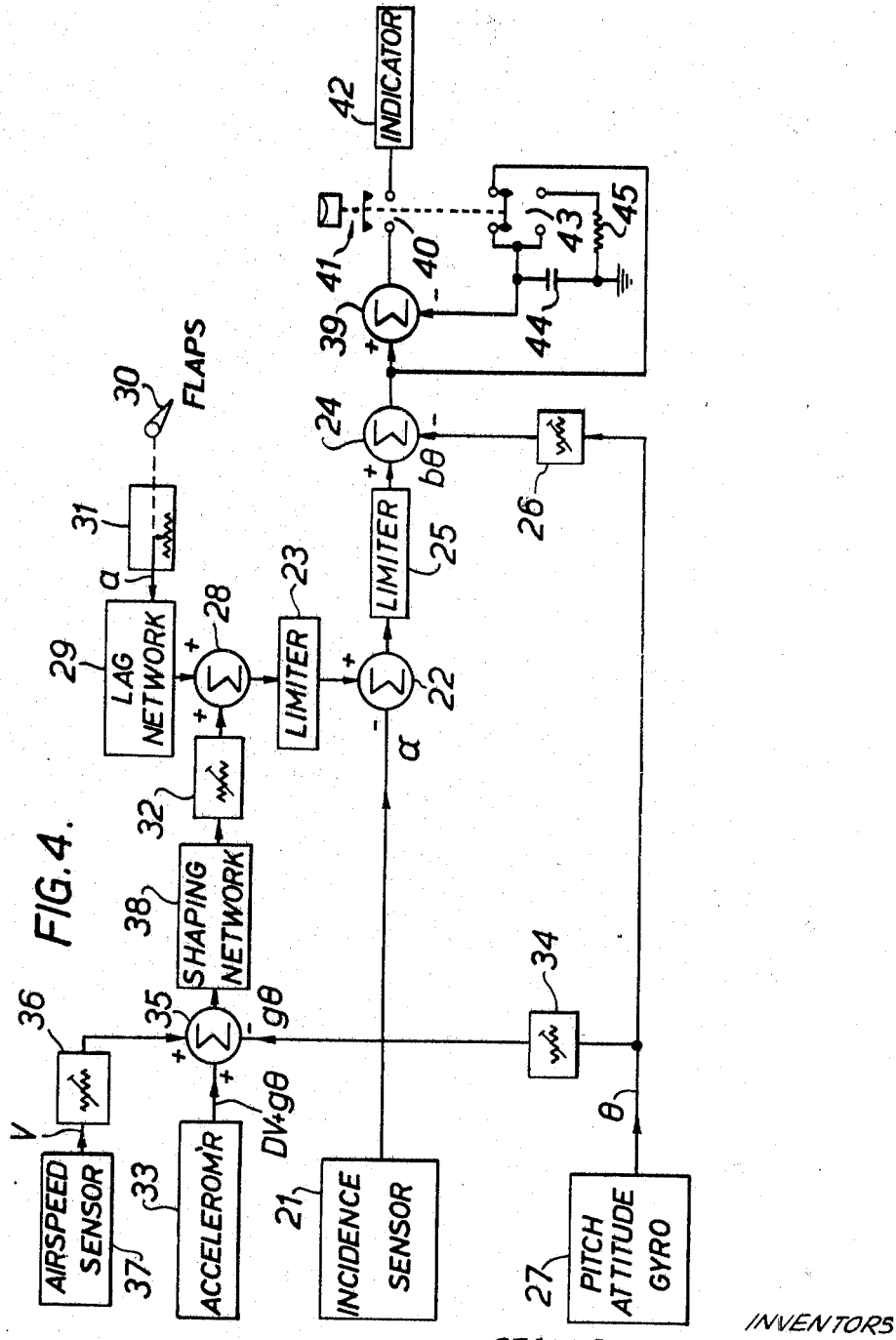

Two aircraft instruments in accordance with the present invention will now be decribed, by way of example, with reference to the accompanying drawings, in which:

FIGURE 1 is a schematic representation of a first of the two aircraft instruments;

FIGURES 2 and 3 serve to illustrate the operation of the instrument of FIGURE 1 during an overshoot manoeuvre; and FIGURE 4 is a schematic representation of the second aircraft instrument.

Referring to FIGURE 1, an incidence sensor 1, which may for example include pressure-sensing orifices or angularly-deflectable vanes mounted externally of the aircraft, is responsive to the angle of incidence of the aircraft and supplies to a summing amplifier 2 an electric signal representative of the sensed angle of incidence $\alpha$. The summing amplifier 2 subtracts this signal from an electric signal supplied thereto via a limiter unit 3, and supplies the resultant signal to a summing amplifier 4 via a further limiter unit 5. The summing amplifier 4 subtracts from this signal an electric signal that is supplied to the amplifier 4 via a pre-set resistance unit 6 from a pitch attitude gyro unit 7. The pitch attitude gyro unit 7, which for example may be the conventional vertical gyro unit of the aircraft, supplies to the unit 6 an electric signal representative of the pitch angle $\theta$ of the aircraft, and the signal which is as a result passed by the unit 6 to the amplifier 4 is representative of $b\theta$. The factor $b$ has a positive value, for example of 0.5 or 0.6, that is dependent upon the resistance-setting of the unit 6.

The signal supplied to the summing amplifier 2 via the limiter unit 3 is supplied from a summing amplifier 8 that receives an electric signal representative of a pre-determined constant angle $a$. The signal representative of angle $a$ is supplied by a pre-set unit 9, the represented value, for example, of eighteen or thirteen degrees, being positive and dependent upon the setting of the unit 9. The unit 9 may be provided, for example, by a pre-set potentiometer arrangement, and it may be arranged that its setting is varied either manually or automatically in accordance with the setting of the flaps of the aircraft.

The summing amplifier 8 receives in addition to the signal representative of the angle $a$, an electric signal derived from an acceleration sensor 10, the sensor 10 being provided, for example, by an accelerometer or an arrangement involving differentiation of a signal that is derived in accordance with speed of the aircraft. The sensor 10 supplies a signal representative of the forward acceleration DV of the aircraft, and this signal is passed to the summing amplifier 8 via a pre-set resistance unit 11. The signal passed from the unit 11 is representative of $cDV$, where the factor $c$ has a positive value dependent upon the resistance-setting of the unit 11, and this is combined additively with the signal representative of angle $a$ in the amplifier 8. The output signal of the summing amplifier 4 is accordingly representative of the extent to which the value of the function:

$$(\alpha + b\theta) \quad (1)$$

differs from the value of the function:

$$(a + cDV) \quad (2)$$

The output signal of amplifier 4, as given by the function:

$$a - (\alpha + b\theta) + DV \quad (3)$$

is supplied via a limiter unit 12 to a further summing amplifier 13. This signal is taken as representative of a demand $(D\theta)_d$, for rate of change of pitch attitude, and as such is limited under the action of the limiter unit 12 to a maximum value of, for example, about 2.5 degrees per second.

In addition to the signal nominally representative of the demanded pitch rate $(D\theta)_d$, the summing amplifier 13 receives a signal that is representative of the actual pitch rate $D\theta$ of the aircraft. This latter signal is derived via a differentiating network 14 from the signal representative of pitch angle $\theta$ supplied by the pitch attitude gyro unit 7. The network 14 has a transfer function:

$$\tau_1 D / (1 + \tau_2 D)$$

where $\tau_1$ and $\tau_2$, which are both constants having the dimension of time, have for example values of three seconds and one second respectively.

The two signals supplied to the summing amplifier 13 are combined therein to provide an output signal representative of:

$$(D\theta)_d - [\tau_1 D / (1 + \tau_2 D)]\theta \quad (4)$$

that is to say, effectively representative in magnitude and sense of any difference between the actual pitch rate and that demanded in accordance with function (3). This output signal is passed from the amplifier 13 to an indicator 15 that provides an indication of the magnitude and sense of the signal. Such indication thereby provides a visual representation of the extent to which the actual pitch rate differs from that demanded, the instrument as a direct consequence of this providing directions for control of the aircraft in pitch required to maintain the value of function (4) zero. When these directions are followed by the pilot throughout an overshoot manoeuvre, a satisfactory flight path for the manoeuvre is achieved, and this applies over a wide range of performance conditions of the aircraft.

When an overshoot manouvre is initiated, that is to say, when the pilot of the aircraft on approach to a landing decides and first takes action to abandon the landing, the flight path of the aircraft is normally inclined downwards at some small angle, for example, three degrees to ground, and the forward acceleration DV is then normally zero. The value of function (3) in these circumstances is normally positive being larger for a fast, steep approach ($\alpha$ and $\theta$ small) than for a slow, flat approach ($\alpha$ and $\theta$ large). Positive values of function (3) demand nose-up pitching movement of the aircraft and so the movement demanded in this respect is correctly related in both magnitude and sense to the conditions existing at the initiation of the overshoot manoeuvre. In extreme cases where the airspeed V of the aircraft during approach has been allowed to decrease towards the stall value $V_s$, the value of function (3) may be negative, and in this case the initial demand until speed is gained is appropriately for a nose-down pitching movement required to avoid stall.

FIGURE 2 shows for the approach to a landing of one particular turbo-jet aircraft, the variation in the value of function (1) through a range of approach speeds. This variation is represented by curve I, the value of constant $b$ being taken as 0.6 and the approach speeds each being expressed as a ratio of the relevant speed V to the stall speed $V_s$. In FIGURE 2 there is also represented, by the broken straight line II and for the case in which the value of constant $a$ is thirteen degrees and the forward acceleration DV is zero, the value of function (1) for which function (3) is zero. The difference in ordinate between curve I and line II at any particular speed is representative in magnitude and sense of the initial demand for pitching movement provided by the instrument. The value of the demand is large and in the nose-up sense for an approach speed of 1.5 $V_s$, and decreases with decrease in approach speed down to the speed, 1.16 $V_s$, at which it becomes zero. At approach speeds less than 1.16 $V_s$ the demand is in the nose-down sense, but large nose-down values do not arise unless the speed is very much less than this.

The indication provided by the indicator 15 directs the pilot to achieve an appropriate climb-gradient $\gamma$ for the climb-out phase following the flare-up pitching movement of the overshoot manoeuvre. By following the direction of indicator 15 to maintain function (4) zero, function (3) is also maintained zero. Any departure from the appropriate climb-gradient $\gamma$ results in change from zero of function (3), and the consequent change from zero of function (4) indicated by the indicator 15 directs the pilot to produce pitching movement of the aircraft in the appropriate sense and at an appropriate rate to restore function (3) to zero and the aircraft to the appropriate flight path. he magnitude of the pitch-rate called for subsides to zero as the aircraft is brought progressively to this flight path.

The appropriate gradient $\gamma$ of the climb-out flight path varies from one flight to another and depends mainly on the weight of theaircraft and the thrust available. For the type of turbo-jet aircraft referred to above in connection with FIGURE 2, the range of achievable climb-gradient $\gamma$ varies from about twenty degrees for high-performance conditions (low weight with all engines operative) down to just over one degree for low-performance conditions (high weight with only one engine operative and in circumstances of high ambient temperature over an airport situated at a high altitude). The climb speed also has an affect on the gradient $\gamma$ but, compared with the effects of weight and thrust, this is not normally significant over the likely range of speeds used in practice.

When function (3) is maintained at zero for the steady climb-out phase, the value of incidence (and thereby of speed) achieved in accordance with the climb capability of the aircraft is well-suited to the performance conditions existing, and this applies throughout the range of performance conditions of the aircraft. If the climb capability is low, the incidence is high and the speed low, whereas if the climb capability is high, the incidence is low and the speed high. This interplay of performance capability and climb speed closely resembles the scheduled procedures laid down for civil aircraft, and is reproduced simply by controlling the aircraft in pitch to maintain function (3) zero. FIGURE 3 illustrates this.

In FIGURE 3, there is shown, by line III, the variation of climb-gradient $\gamma$ with incidence $\alpha$ implicit in control function (3) for the steady climb-out condition (forward acceleration DV zero), the values of the constants $a$ and $b$ being taken, as before, as thirteen degrees and 0.6 respectively. The line III (since $\theta = \alpha + \gamma$) is the line:

$$1.6\alpha + 0.6\gamma = 13$$

and this intersects curves IV to VI which respectively represent the variation in climb capability of the aircraft with incidence $\alpha$ under three different performance conditions. Curves IV and VI are those applicable respectively to the high and low extremes of performance conditions, whereas the curve V is that applicable to an intermediate condition under which the weight is high but all engines are operative. The intersection of the line III with each curve IV to VI indicates the climb-incidence that results from maintaining function (3) zero under the relevant performance condition.

When a steady climb-out condition has been established, the angle of the flaps will be reduced with consequent increase in forward speed and reduction in angle of incidence. With change in flap-angle, the setting of the unit 9 is altered to reduce the angle $a$ to a value appropriate to the increased forward speed and reduced angle of incidence that will obtain in the new steady state. Such reduction is necessary in order to ensure that the demand produced by the instrument is that appropriate to the establishment of this steady state. However, until this steady state is achieved, that is to say, during the transitional stage for which the aircraft is accelerating to the increased forward speed, the use of the reduced value of angle $a$ tends to call for reduction in the value of function (1). With the instrument according to the present invention, however, this tendency with the likelihood of a resultant decrease in the flight-path gradient, is counteracted. The demand is here also dependent upon the forward acceleration DV, the term $cDV$ acting in the demand represented by function (3), effectively to boost the value of angle $a$ during the transitional stage.

With one turbo-jet transport aircraft, the flap-angle is reduced from fifty to twenty-five degrees upon initiation of overshoot, and is then further reduced to fourteen degrees when a height of four-hundred feet has been attained in the steady climb-out. The forward speed is maintained at about one-hundred-and-forty knots while the flap-angle is twenty-five degrees, but is increased to one-hundred-and-seventy knots following reduction of the flap-angle to fourteen degrees. This increase in speed and reduction of flap-angle results, in the steady state, in a decrease of 3.2 degrees in the incidence $\alpha$ and an increase in climb-gradient $\gamma$ of one degree. With a flap-angle of fourteen degrees the climb-gradient $\gamma$ of the aircraft in the low-performance condition is only 2.7 degrees when the steady-state is achieved, and in order that the climb-gradient $\gamma$ shall not fall to zero during the transition to this steady-state, it is necessary to limit the forward acceleration DV at this time to about 0.8 knot per second.

In order, with this aircraft, to adapt the demand-law given by function (3) to the desired values of incidence $\alpha$ and gradient $\gamma$ for the new steady-state, it is necessary to reduce the value of angle $a$ by 4.5 degrees. The reduction is made by resetting the unit 9 as the flap-angle is reduced to fourteen degrees, and a consequence of this is that the value of the function $$a - (\alpha + b\theta) \qquad (5)$$

is negative during the transition to the new steady state, and can be brought to zero initially only if the aircraft descends at a gradient of some four degrees. However, the forward acceleration DV during the transitional stage gives rise to a demand-component, $cDV$, that acts to counteract this negative value of function (5) and thereby obviate the situation that otherwise would occur where the demand can be satisfied only by causing the aircraft to descend.

The demand-component $cDV$ is of such a magnitude as to provide a positive value of function (3) throughout the transitional stage, so that the resulting demand calls for climb of the aircraft. The positive factor $c$ of this demand-component is chosen such that until the forward speed required for the new steady-state is reached, that is to say throughout the transition, the value of function (1) called for allows for reasonable acceleration DV, but at the same time does not result in negative gradient $\gamma$. With the forward acceleration DV measured in feet per second per second, the constant $c$ may have, for example, a value of five.

The above detailed considerations have dealt only with the situation that exists at the initiation of the overshoot manoeuvre and with the climb-out phase. Nonetheless, the indication provided by the indicator 15 directs the pilot through the intervening part of the manoeuvre to provide the pitching movement that is required to reduce function (3) to zero and achieve the desired flare-up from the approach path into the appropriate climb-out path. The indicator 15, in accordance with function (4), directs the pilot to produce this flare-up with a controlled, and limited, pitch-rate. Thus, throughout the whole overshoot manoeuvre (and right from the instant of its initiation), the indicator 15 directs the pilot to control the aircraft in pitch in a manner appropriate to achieve a satisfactory flight path, and this applies over a wide range of performance conditions of the aircraft.

The demand-component $cDV$ is effective during the initial stage of the flare-up to ensure that the demand is for a climbing flight path. This is particularly important in the low-performance condition where the value of function (5) may become negative at the beginning of the flare-up. Without the demand-component $cDV$, the demand provided could well result in a dip in the flight path following the initial pull-up movement of the flare-up manoeuvre, the pull-up movement resulting in a loss of forward speed that with the increased gradient $\gamma$ can only be offset in meeting the demand by reducing the incidence $\alpha$. With the reduced incidence there is reduction in lift, and there then follows a situation in which the demand can be satisfied only by acceleration along a downward path to restore the speed. The presence of the demand-component $cDV$, however, tends to suppress the loss of speed from the beginning of the flare-up, the effective boost it gives to the value of angle $a$ in the demand of function (3) being met by increasing the incidence $\alpha$ of the aircraft. This increase in incidence $\alpha$ acts to maintain the lift required.

The indication provided by the indicator 15 is preferably made available to the pilot only when, during an approach to a landing, he initiates the overshoot manoeuvre. To this end, a simple switch may be included between the summing amplifier 13 and the indicator 15 to be operated by the pilot and then supply the signal representative of function (4) to the indicator 15, only when the overshoot is to be made. This switch may be arranged, for example, such that it is operated automatically if there is rapid opening of the engine-throttles during a landing-approach. When a switch is used in the above manner, the director demand is presented as a sudden change in indication of the indicator 15, and if this is found disconcerting, it may be preferable to arrange that the demand is introduced gradually. In this connection, the desired gradual introduction of the demand can be achieved with the system of FIGURE 1 simply by arranging that until the switch is operated to initiate overshoot, the limit imposed upon the demand $(D\theta)_d$ by the limiter unit 12 is zero degrees per second, and that this limit is increased gradually to its full value following operation of the switch.

The provision of the limiter unit 3, providing a limit on the total value of function (2), is regarded as being very desirable in the present instrument since otherwise a dangerous value of incidence $\alpha$ could be called for by the demand of function (3). This is particularly important at the beginning of the overshoot meanoeuvre when the gradient $\gamma$ is negative.

Although the instrument described above with reference to FIGURE 1, the remand base on function (3) is presented as a demand for pitch-rate, this is note essentially so. Instead of comparing the value of function (3) with the pitch-rate of the aircraft and then displaying the difference, the value of function (3) may be displayed directly, the pilot being directed thereby to reduce the indicated value to zero as before, but not in this case at a controlled rate. The second form of aircraft instrument that is to be described with reference to FIGURE 4 is one in which the value of the basic control function (3) is displayed directly and the direction given thereby is introduced gradually upon initiation of the overshoot manoeuvre.

Referring to FIGURE 4, an incident sensor 22 supplies to a summing amplifier 22 a signal representative of the angle of incidence $\alpha$ of the aircraft, and this is subtracted in the amplifier 22 from a signal representative of function (2) supplied from a limiter unit 23. The output signal from the amplifier 22 is supplied to a summing amplifier 24 via a limiter unit 25, the amplifier 24 also receiving a signal that is supplied via a pre-set resistance unit 26, from a pitch attitude gyro unit 27. This latter signal, being representative of the term $b\theta$, is subtracted in the amplifier 24 from the signal received via the limiter unit 25, with the result that the output signal of the amplifier 24 is representative of the difference in values between functions (1) and (2).

The signal representative of function (2) supplied to the summing amplifier 22 via the limiter unit 23 is derived from a summing amplifier 28. The amplifier 28 receives via a lag network 29 a signal representative of an angle $a$ appropriate to the setting of the flaps 30 of the aircraft, such signal being supplied to the lag network 29 from a pick-off unit 31 coupled to the flaps 30. The lag network 29 (having a time constant of, for example, two seconds) ensures that changes in the value of angle $a$ effected by the pick-off 31 upon change of flap-angle, are introduced smoothly in the signal supplied to the amplifier 28. The amplifier 28 adds to this signal a signal representative of the term $cDV$ that is supplied from a pre-set resistance unit 32. The unit 32 derives this latter signal that is dependent upon forward acceleration $DV$ of the aircraft and is generated using an accelerometer 33.

The accelerometer 33, which may be in the form of a pendulum mounted for angular displacement about an axis parallel to the pitch axis of the aircraft, supplies a signal representative of $(DV+g \sin \theta)$, where $g \sin \theta$ is an unwanted gravitational component. The gravitational component is approximately equal to $g\theta$ in practice, and a signal representative of this is derived by a pre-set resistance unit 34 from the output signal of the pitch attitude gyro unit 27. This signal is subtracted in a summing amplifier 35 from the signal supplied by the accelerometer 33 so as substantially to cancel out the unwanted gravitational component. (In certain circumstances it may be found preferable for practical reasons to compensate in the amplifier 35 for only a part, for example, only some ninety percent, of the gravitational component.)

The signal supplied by the accelerometer 33, after subtraction of the signal derived by the resistance unit 34 and suitable filtering, could be supplied alone via the resistance unit 32 to provide the signal representative of $cDV$. However, in the present instance it is preferred to derive this latter signal using a complementary filtering technique in which a signal representative of $V/\tau_3$ is added in the amplifier 35 to the signal from the accelerometer 33, and the output signal of the amplifier 35 is passed to the resistance unit 32 via a shaping network 38 having a transfer function:

$$\tau_4 D/(1+\tau_3 D)$$

where $\tau_3$ and $\tau_4$ are both constants having the dimension of time. The signal representative of $V/\tau_3$ is derived by a pre-set resistance unit 36 from a signal representative of airspeed $V$ supplied by a manometric airspeed sensor 37.

The resistance unit 36 is normally set to provide for equality (for example, at a value of six seconds) between the two time-constants $\tau_3$ and $\tau_4$, so that the filtered output signal of the network 38 is representative of $DV$, there being substantial elimination from this signal of the effects of long-term errors arising in the accelerometer 33 and pitch attitude gyro unit 27, and of short-term errors arising in the airspeed sensor 37. Absolute equality between the two time-constants is not an essential however, in achieving the desired output signal representative of function (2) from the amplifier 28.

The output signal of the amplifier 24 is representative of function (3), being derived as the difference between function (2) represented by the output signal of the amplifier 28, and function (1) represented by the sum of the signals from the units 21 and 26. This signal is supplied directly to a summing amplifier 39 whose output is connected via a contact-set 40 of a push-button switch 41 to an indicator 42, and is also supplied directly to a change-over contact-set 43 of the switch 41. When the switch 41 is unoperated the contact-set 40 is open, whereas the contact-set 43 passes the output signal of the summing amplifier 24 to appear across a capacitor 44. The signal appearing across the capacitor 44 is applied to the summing amplifier 39 to be subtracted therein from the signal applied directly from the summing amplifier 24. When the switch 41 is operated, the contact-set 40 is closed to pass the output signal of the summing amplifier 39 to the indicator 42. At the same time, the contact-set 43 is switched over to break the supply therethrough of the signal from the summing amplifier 24, and to connect a resistor 45 across the capacitor 44.

During an approach to a landing and before the initiation of an overshoot maneuver, the push-button switch 41 remains unoperated, and in these circumstances the signal representative of the value of function (3) is applied to the summing amplifier 39 both directly and from across the capacitor 44. Accordingly, the output signal of the summing amplifier 39 is maintained at zero until the push-button switch 41 is operated. When the overshoot manoeuvre is initiated, the pilot operates switch 41 thereby closing the contact-set 40 and supplying the output signal of the summing amplifier 39 to the indicator 42. Operation of the switch 41 also connects, via the contact-set 43, the resistor 45 across the capacitor 44. Thus, although initially the value of signal supplied to the indicator 42 is zero, this value rises exponentially towards the value of the output signal from the summing amplifier 24, as the capaictor 44 discharges through the resistor 45. The time constant of discharge is, for example, two seconds, and once the capacitor 44 is fully discharged the indicator 42 thereafter indicates the full value of the output signal from the summing amplifier 24, that is to say, the value of function (3). The pilot controls the aircraft in pitch to reduce the indication, and thereby the value of function (3), to zero, and accordingly achieve the appropriate climb-out. The indication simply shows the extent to which function (1)

differs from function (2), and does not give direction as to the pitch-rate at which this difference is to be reduced to zero.

Each of the indicators 15 and 42 referred to above may be of the general kind described in British Patent No. 853,034, but may be a normal form of director-horizon instrument or a center-zero meter of conventional form. In the former case, each indicator may be specifically as described in British Patent No. 886,136, and include one or more cylindrical members each of which is mounted for rotation about its longitudinal axis and carries an optically distinct helical band coaxial therewith, the cylindrical member in each instance being rotated by a servo system at a rate and in a sense dependent upon the magnitude and sense respectively of the signal received by the indicator, so that the helical band provides an optical effect of movement at a rate and in a sense dependent upon the magnitude and sense of function (4) or function (3) as the case may be. When this form of indicator is used, the pilot controls the aircraft in pitch to achieve the condition in which the cylindrical members do not rotate, and so thereby comply with the relevant director law.

Although in the instrument described above with reference to FIGURE 1, the signal dependent upon pitch rate is derived by the network 14 from the signal representative of pitch angle $\theta$, it may instead be supplied from a pitch rate gyro. Furthermore, although the signals representative respectively of the demanded and actual pitch rates are combined in the amplifier 13 to provide a signal that represents the difference between them, this is not necessarily the case. The instrument may instead include an indicator that is supplied with the two signals separately and which provides indications of both in such a way as to enable the pilot readily to compare the two. Such an indicator may include two movable indices which are arranged to be positioned in accordance with the two signals respectively, so that the required indication is provided by the positions of the two indices relative to one another. The two indices may be movable along parallel paths one in front of the other, and may be arranged to be positioned along said paths in accordance with the two signals such that the front index lies directly in front of the rear index when function (4) is substantially zero. In these circumstances the rear index may have a width, measured in the direction of its path of movement, which is substantially larger than the corresponding width of the front index, the front index being arranged to be positioned in accordance with the signal dependent upon rate of change of pitch attitude, and the rear index being arranged to be positioned in accordance with the signal dependent upon the demanded pitch rate. Similar considerations apply in relation to the display of the difference between functions (1) and (2) in the case of the instrument of FIGURE 4.

We claim:

1. An aircraft instrument comprising first means for providing a first signal dependent upon pitch attitude $\theta$ of the aircraft, second means for providing a second signal dependent upon incidence $\alpha$ of the aircraft, third means for providing a third signal dependent upon forward acceleration DV of the aircraft, and fourth means for providing in acordance with said first, second and third signals a representation dependent upon the difference between the function $(\alpha+b\theta)$ and the function $(a+cDV)$, where $a$ is a positive-valued constant and $b$ and $c$ are positive-valued factors.

2. An aircraft instrument according claim 1 wherein said fourth means is means for providing a representation of said difference in both magnitude and sense.

3. An aircraft instrument according to claim 1 wherein said third means includes an accelerometer responsive to the forward acceleration DV of the aircraft.

4. An aircraft instrument according to claim 1 wherein the value $a$ is selectively variable, the instrument including selectively-variable means for supplying to said fourth means a signal in accordance with the value selected.

5. An aircraft instrument according to claim 4 wherein the valve of said constant $a$ is dependent upon the setting of flaps of the aircraft, the instrument further including means to set said selectively-variable means in accordance with the flap setting.

6. An aircraft instrument according to claim 1 wherein said representation is a signal representative of a demanded rate of change of pitch attitude, and the instrument includes means for providing a signal in accordance with the actual rate of change of pitch attitude of the aircraft, and means for providing a representation of the difference between the demanded and actual rates of change of pitch attitude.

7. An aircraft instrument according to claim 6 including an indicator for providing a visual representation in magnitude and sense of the difference between the demanded and actual rates of change of pitch attitude.

8. An aircraft instrument according to claim 1 wherein said fourth means includes an indicator for providing a visual representation of said difference.

9. An aircraft instrument according to claim 8 wherein said fourth means includes a selectively-operable electric switch, means for supplying an electric signal in accordance with said difference, and electric circuit means interconnecting said switch and said indicator for applying said electric signal to said indicator only when the switch is in its operated state.

10. An arcraft instrument according to claim 9 wherein said circuit means includes means responsive to operation of said switch to introduce said electric signal to said indicator gradually.

11. An aircraft instrument according to claim 10 including a capacitance, means for supplying said electric signal to charge the capacitance while the switch is unoperated, a resistance, means responsive to operation of said switch to connect said resistance across the capacitance so as thereby to discharge the capacitance, and means for subtracting from the signal supplied to said indicator when the switch is in its operated state the signal appearing across the capacitance.

12. An aircraft instrument comprising first means for providing a first signal representative of pitch angle $\theta$ of the aircraft, second means for providing a second signal representative of incidence angle $\alpha$ of the aircraft, third means for providing a third signal representative of forward acceleration DV of the aircraft, and fourth means for providing in accordance with the three signals a visual representation of the value in magnitude and sense of the function:

$$a-(\alpha+b\theta)+cDV$$

where $a$ is a positive-valued constant and $b$ and $c$ are positive-valued factors.

13. An aircraft instrument according to claim 12 wherein said third means comprises an accelerometer for providing a signal dependent upon the forward acceleration DV of the aircraft, an airspeed sensor for providing a signal dependent upon the forward speed V of the aircraft, and a shaping network for deriving said third signal in accordance with a filtered combination of the two signals provided by the accelerometer and airspeed sensor.

References Cited

UNITED STATES PATENTS 3,369,396 2/1968 Russell et al. _____ 73—178
3,370,461 2/1968 Bradbury et al. _____ 73—178

DONALD O. WOODIEL, Primary Examiner